United States Patent [19]

DeCrouppe et al.

[11] Patent Number: 5,682,789

[45] Date of Patent: Nov. 4, 1997

[54] SELECTOR LEVER SYSTEM FOR MANUALLY SHIFTABLE AUTOMATIC TRANSMISSIONS

[75] Inventors: Guido DeCrouppe, Kerpen-Horrem; Graeme Turner, Much, both of Germany

[73] Assignee: Ford Global Technologies, Inc., Dearborn, Mich.

[21] Appl. No.: 626,587

[22] Filed: Apr. 2, 1996

[30] Foreign Application Priority Data

Apr. 8, 1995 [DE] Germany .......................... 195 13 397.8

[51] Int. Cl.$^6$ .............................. F16H 59/04; F16H 63/38
[52] U.S. Cl. ........................... 74/335; 74/473 R; 74/475; 74/538
[58] Field of Search ............................ 74/335, 473 R, 74/475, 538

[56] References Cited

U.S. PATENT DOCUMENTS 5,197,344  3/1993  Maier et al. .......................... 74/335

FOREIGN PATENT DOCUMENTS

| 0 331 797 | 10/1992 | European Pat. Off. . |
| 3331223 | 12/1986 | Germany . |
| 43 05 015 | 3/1994 | Germany . |
| 6-17911 | 1/1994 | Japan ......................... 74/335 |

*Primary Examiner*—Allan D. Herrmann
*Attorney, Agent, or Firm*—James J. Dottavio

[57] ABSTRACT

In a selector lever system for manually shiftable automatic transmissions for motor vehicles, comprising a selector lever movable in a gear shifting gate in only one plane in a plurality of gear shift positions. The shift positions include a manual drive position from which the lever can be moved into a first direction to command an upshift and in a second direction to command a downshift. The lever is biased back to the manual drive position after the upshift or downshift command is given. The system also includes sensors for detecting movement in the first and second directions from the manual drive position. The system includes a cam and spring loaded pin which prevents the lever from being positioned in the manual drive position.

8 Claims, 3 Drawing Sheets

SELECTOR LEVER SYSTEM FOR MANUALLY SHIFTABLE AUTOMATIC TRANSMISSIONS

FIELD OF THE INVENTION

The invention relates to a selector lever system for manually shiftable automatic transmissions for motor vehicles.

BACKGROUND OF THE INVENTION AND PRIOR ART

The starting point of the invention is a selector lever for automatic transmissions of motor vehicles such as is disclosed in German patent specification 43 05 015 and which is movable in a gear shifting gate, in only one plane, forward or backward into the well-known P, R, N and D and 2 and 1 positions.

From German patent specification 33 31 232 a gear shift lever for an automatically shiftable manual transmission of motor vehicles is known which can be moved in only one plane forward or backward and with which, depending on two switches arranged on the handle of the selector lever, an upshift or downshift can be initiated by moving the shift lever forward or backward respectively. In this case it is only possible to change between the two gear steps which are associated with a shifting range which is predetermined by the position of the switch on the selector lever.

Consequently this known shift lever has the disadvantage that at any time it is only possible to change between two gear steps, after which, in order to change between the next two gear steps, one of the switches on the shift lever must first be operated. Thus it can hardly be said that the object of simplifying a shifting operation is achieved, since as well as operating the shift lever the driver of the vehicle must also undertake the operation of various switches.

European Patent Specification 0 331 797 ('797) discloses a selector lever for manually shiftable automatic transmissions of motor vehicles, which is of substantially the kind described in this disclosure. To manually shift a transmission according to the '797 patent, the selector lever must be moved out of the one plane used for selecting the conventional P, R, N, D, 3, 2 and 1 positions. The lever must be moved into a second parallel plane within a second gear shifting gate. In the second plane, a forward position "+" actuates a switch effecting an upshift and a rear position "−" actuates a switch effecting a downshift. The selector lever is spring-loaded to return it from each of these two positions into middle or neutral position within the second plane. The sideways pivoting into the second shifting gate increases the mechanical complexity of the '797 shifting system, which increases the costs of production and assembly.

It would therefore be desirable to provide a selector lever system for manually shiftable automatic transmissions for motor vehicles which furnishes, with the lowest possible production and assembly costs, extremely simple and rational usage of the manual shiftability by the driver.

SUMMARY OF THE INVENTION

It is an object of the invention the provide a selector lever system for manually shiftable automatic transmissions for motor vehicles of the kind referred to which furnishes, with the lowest possible production and assembly costs, extremely simple and rational usage of the manual shiftability by the driver.

To this end, a selector lever system for manually shiftable automatic transmissions for motor vehicles comprises a selector lever movable in a gear shifting gate in only one plane into a plurality of gear shift positions. The shift positions include a manual drive position from which the lever can be moved into a first direction to command an upshift and in a second direction to command a downshift. The lever is biased back to the manual drive position after the upshift or downshift command is given. The system also includes a sensing means for detecting movement in the first and second directions from the manual drive position. The system further includes a biasing means which prevents the lever from being positioned in the manual drive position.

Through this combination of features, by a minimum of modification, a selector lever system is obtained which provides an extremely simple and rational means for effecting manual shifting of an automatic transmission.

DETAILED DESCRIPTION OF A PREFERRED EMBODIMENTS

Figure 1:
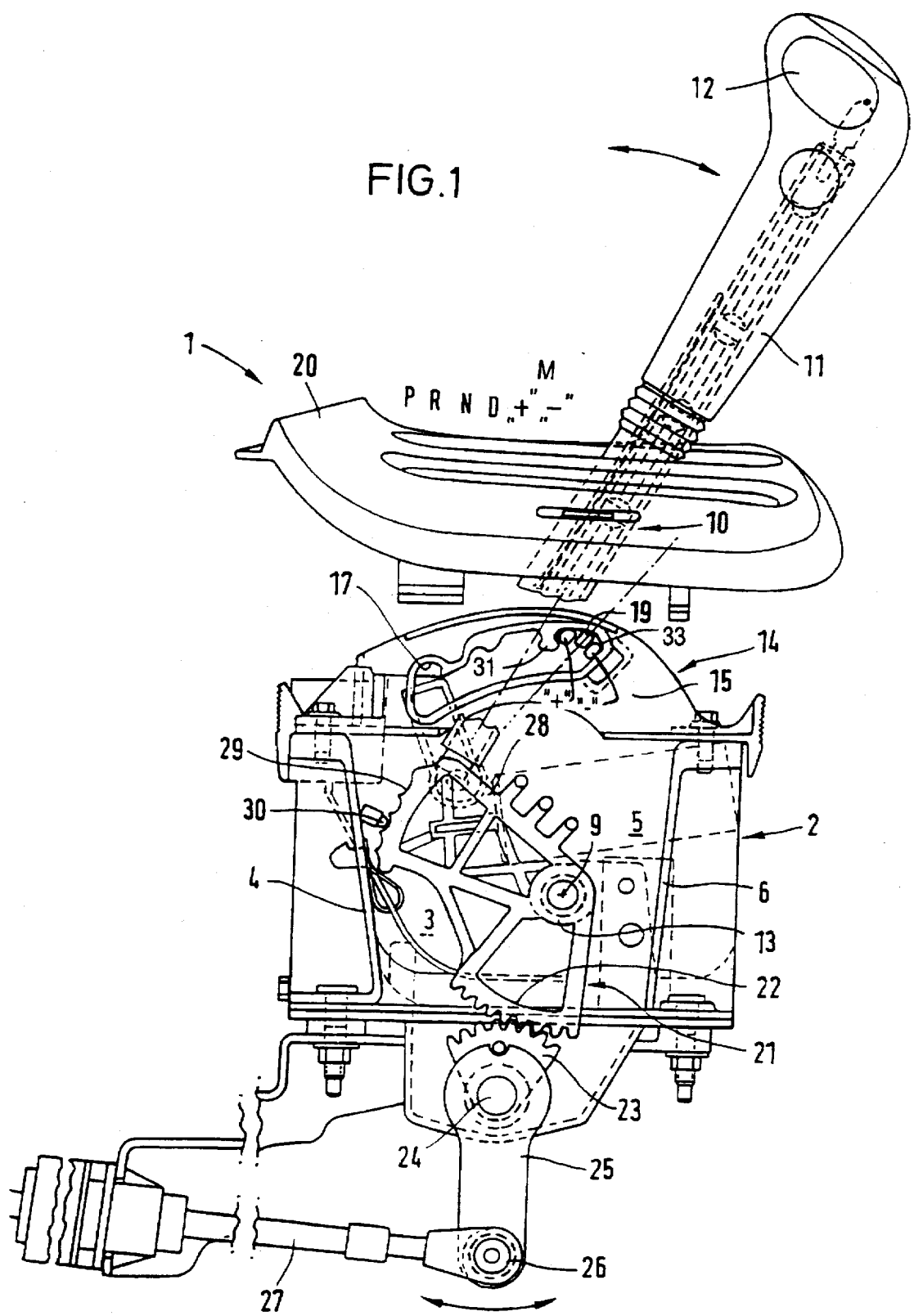
FIG. 1 is a vertical side view of a selector lever system according to the invention, in which the parts essential to the invention are emphasized by omission of parts of the side wall.
Figure 2:
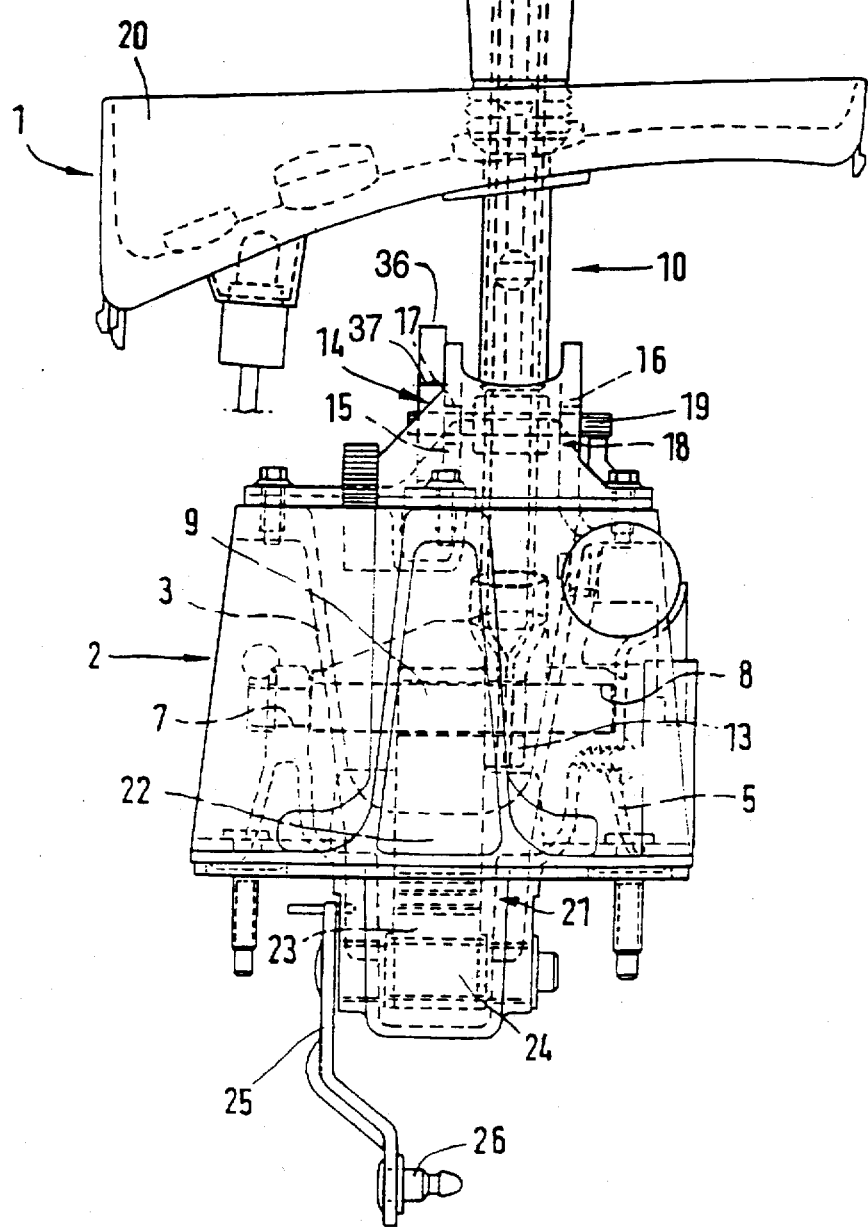
FIG. 2 is a vertical rear view of the selector lever system of FIG. 1.

As shown in FIG. 1, a selector lever system 1 for an automatic transmission of a motor vehicle consists essentially of a selector lever housing 2, which can be fixed to the floor of the vehicle (not shown) and is preferably made from a suitable high-grade plastics material by injection moulding. The dome-shaped selector lever housing 2 has generally vertical side walls 3, 4, 5 and 6, of which the two lateral side walls 3 and 5 are provided with openings 7 and 8 for mounting a horizontal transverse axle 9.

The selector lever is movable in a first direction (forward toward P as shown in FIG. 1) and a second direction opposed to the first direction (rearward toward D) in a gear shifting gate in only one plane into conventional gear shift positions (P, R, N and D and 1 and 2). The lever can be brought into a manual drive position (M), rearward the (D) position as shown in FIG. 1, from which it can be brought into a forward position "+" commanding an upshift and into a rear position "−" commanding a downshift, as described below.

A selector lever 10 has at its top a handle 11 with a control knob 12 and is connected at the bottom to a mounting member 13, by means of which it is pivotally mounted on the horizontal transverse axle 9.

The dome-shaped selector lever housing 2 is covered at the top by a parallel-walled detent member 14, in the side walls 15 and 16 of which notched gates 17 and 18 are formed, which cooperate with a detent device in the form of a horizontal stop pin 19, which can be controlled by the control knob 12 via a suitable connection (shown only in broken lines). The selector lever system is hidden from the interior of the vehicle in a stylistically pleasant manner by a cover 20.

The selector lever system as described up to this point essentially corresponds to a conventional design, with the mounting member 13 having arms extending both above and below the horizontal transverse axle 9 which can be used to attach the Bowden cable connections to the automatic transmission, the direction of the selection movement either being unchanged or being changed once, depending on whether the Bowden cable mechanism is disposed above or below the horizontal transverse axle 9.

The mounting member 13 is connected to a connecting mechanism 21 comprising a first toothed segment 22, formed on the mounting member 13, that is in engagement with a second toothed segment 23 mounted on a lower horizontal transverse axle 24 that is pivotally accommodated in portions of the downwardly extending side walls 3 and 5 of the selector lever housing 2. A lever arm 25 is mounted non-rotatably on the lower horizontal transverse axle 24, and has the Bowden cable connection 27 to the lower end 26 of the automatic transmission.

On the mounting member 13 another upwardly extending cam segment 28 is provided, having a plurality of notches 29 which cooperate with a spring detent 30 in order to locate the position of the selector lever more precisely.

Up to this point the selector lever system corresponds to the selector lever system which forms the starting point of the present invention and is described in German patent specification 43 05 015.

The selector lever system of the invention differs from this known embodiment in respect of the notched gate and of the detent system, which will now be described in connection with the larger scale illustration in FIG. 3.

According to the invention the parallel-walled detent member 14, in the side walls 15 and 16 of which notched gates 17 and 18 are formed which cooperate with a horizontal stop pin 19, is formed in a particular manner which will now be explained.

The detent recesses in the notched gate in the regions corresponding to the selector lever positions P, R, N and D remain unchanged: the only changes are in the region of the shift positions 2 and 1 from the prior art, which are not present in the preferred embodiment in favor of the manual drive position as described below.

To downshift from D to shift positions 2 and 1, the operator must first operate the control knob 12 on the handle 11 of the selector lever 10, shown in FIG. 1. The lever then moves into the manual drive position M and permits the driver to command a downshift as described below, thereby obtaining the 2 and 1 gears. As shown in FIG. 3, the blocking cam provided for this purpose is indicated by 31. According to the invention, an inverted v-shaped angle section 32 is provided adjacent the blocking cam 31. Two slopes 34 and 35 proceed from the apex 33 of the inverted v-shaped angle section 32.

Figure 3:
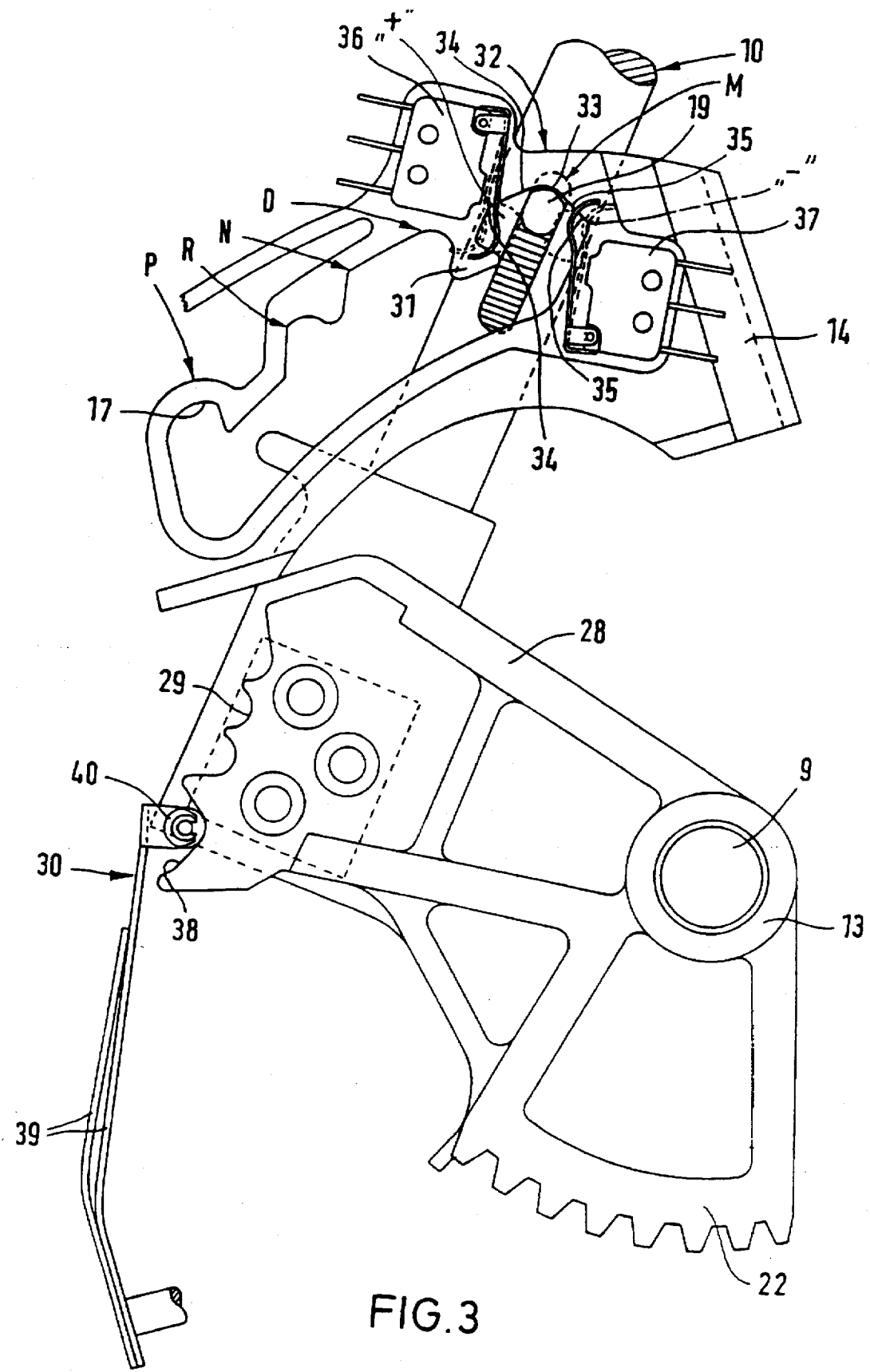
FIG. 3 is a representation on a larger scale of the parts of the selector lever gate that are essential to the invention.

As shown in FIG. 3, the spring-loaded stop pin 19 is pressed into the apex position 33 of the inverted v-shaped angle section 34, 35 of the notched gates 17 and 18, thereby holding the selector lever in the manual drive position M.

If the selector lever is moved out of manual drive position M into a forward position "+", a limit switch 36 is actuated to command an upshift. If the selector lever is moved into a rear position "−" it actuates a limit switch 37 to command a downshift. As soon as the manual operating force acting on the selector lever ceases, because of the slopes 34 and 35 the spring-loaded stop pin 19 guides the selector lever back into manual drive position M.

It may be that for reasons of comfort the spring force provided for operation of the plunger pin cannot be made great enough for the desired rapid return of the selector lever into the manual drive position M to take place with the desired force. Hence according to a further aspect of the invention it is proposed, on the cam segment 28 having the notches 29 and the spring detent 30 which is present on the bearing member 13, to form the last of the notches 38, which corresponds functionally to the inverted v-shaped angle section 33, 34 and 35 in the notched gate, in a similar way, and to make it cooperate with a detent roller 40 which is reinforced by a double spring mechanism 39, which effects the desired reliable return movement of the selector lever into manual drive position M.

The actual control of the manually shiftable automatic transmission of motor vehicles does not directly form any part of the invention. However, it is obvious that the upshifts or downshifts that the driver desires to effect by moving the selector lever forward or backward will be tested by the electrohydraulic control system of the automatic transmission before they are put into effect, to determine whether they can be carried out without damage to the transmission. That is to say, a multiple downshift commanded at high speed by repeatedly tapping the selector lever backward is not carried out in one step but in a sequence of successive shifts as soon as the appropriate vehicle speed is reached at which the corresponding downshift can take place without damage to the transmission. The same applies, mutatis mutandis, for upshifts which are commanded by a plurality of forward tapping movements.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A selector lever system for manually shiftable automatic transmissions for motor vehicles, comprising:

a selector lever movable within a gear shifting gate in only one plane, the lever being positionable into a plurality of gear shift positions, including a manual drive position from which said lever is urged in a first direction to command an upshift and urged in a second direction to command a downshift;

means for sensing movement of said lever in said first and second directions from said manual drive position;

biasing means for urging said lever back to the manual drive position after an upshift and downshift is commanded;

means for preventing movement of the lever into the manual drive position; and means for overcoming the means for preventing movement of the lever into the manual drive position.

2. A shift lever according to claim 1, wherein the means for sensing movement of said lever to command an upshift and a downshift comprises a first switch and a second switch, each switch being mounted adjacent the shift lever so when the lever moves in the first direction the first switch is engaged and when the lever moves in the second direction the second switch is engaged, thereby commanding an upshift and downshift, respectively.

3. A shift lever according to claim 2, wherein the biasing means comprises a spring-loaded stop pin projecting from said shift lever and an inverted v-shaped angle section mounted adjacent said pin in the manual drive position, wherein said pin is moved relative to the angle section, the spring-loaded pin acts against the angle section to urge the lever back to the manual drive position.

4. A shift lever according to claim 3, wherein the means for preventing movement of the lever into the manual drive position comprises a cam mounted adjacent said spring loaded pin in the manual drive position, wherein said cam prevents travel of the pin to the manual drive position.

5. A shift lever according to claim 4 wherein the means for overcoming the means for preventing movement of the lever into the manual drive position comprises:

a button carried on said shift lever; and a means for actuating said stop pin from engagement with said cam, said actuating means being operably connected to said button.

6. A selector lever system according to claim 5, wherein said gear shift positions comprise park, neutral, drive and manual drive, said positions being aligned in a single plane and said drive position being arranged between said neutral and manual drive positions.

7. A selector lever system according to claim 6, further comprising:

a second cam having a plurality of notches corresponding to said gear shift positions, said second cam being movable upon movement of said selector lever;

a roller detent engageable in said notches of said second cam upon movement of said shift lever; and resilient means for urging said roller detent into engagement with said cam, whereby said shift lever is aligned within a selected gear position.

8. A selector lever system according to claim 7, wherein said resilient means comprises a plurality of leaf springs, one of said springs being connected to said roller detent and a second one of said leaf springs being connected to a housing for the selector lever system.

* * * * *